(12) United States Patent
Clatanoff et al.

(10) Patent No.: US 10,001,617 B2
(45) Date of Patent: Jun. 19, 2018

(54) FIBER MANAGEMENT ASSEMBLIES AND NETWORK INTERFACE DEVICES INCORPORATING SUCH ASSEMBLIES

(71) Applicant: 3M INNOVATIVE PROPERTIES COMPANY, St. Paul, MN (US)

(72) Inventors: William J. Clatanoff, Austin, TX (US); Zachary M. Thompson, Austin, TX (US); Donald K. Larson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/155,629

(22) Filed: May 16, 2016

(65) Prior Publication Data
US 2016/0349472 A1 Dec. 1, 2016

(51) Int. Cl.
*G02B 6/00* (2006.01)
*G02B 6/44* (2006.01)
*G02B 6/38* (2006.01)

(52) U.S. Cl.
CPC ............ *G02B 6/445* (2013.01); *G02B 6/444* (2013.01); *G02B 6/3897* (2013.01); *G02B 6/4453* (2013.01)

(58) Field of Classification Search
CPC ...... G02B 6/445; G02B 6/444; G02B 6/3897; G02B 6/4453
USPC .................................................. 385/135–137
See application file for complete search history.

(56) References Cited

U.S. PATENT DOCUMENTS

| | | | | |
|---|---|---|---|---|
| 4,911,662 A | | 3/1990 | Debortoli | |
| 5,353,366 A | * | 10/1994 | Bossard | G02B 6/2551 385/134 |
| 5,778,122 A | | 7/1998 | Giebel | |
| 5,825,962 A | * | 10/1998 | Walters | G02B 6/4452 385/135 |
| 5,929,381 A | | 7/1999 | Daoud | |
| 6,382,845 B1 | * | 5/2002 | Gould | G02B 6/3801 385/134 |

(Continued)

FOREIGN PATENT DOCUMENTS

| | | |
|---|---|---|
| CN | 201425648 | 3/2010 |
| CN | 101840039 | 9/2010 |

(Continued)

OTHER PUBLICATIONS

International Search Report for PCT/US2016/031633, dated Aug. 22, 2016, 3 pp.

(Continued)

*Primary Examiner* — Ryan Lepisto
*Assistant Examiner* — Guy Anderson
(74) *Attorney, Agent, or Firm* — Gregg H. Rosenblatt

(57) ABSTRACT

Fiber management assembly comprises an optical fiber splitter, a splice holding section having a fiber splice device mounted therein, and a slack storage system. The optical fiber splitter, splice holding section and slack storage system are disposed on one of a tray and an interior surface of an enclosure body. In addition, patch panel tray having a patch panel comprising a plurality of adapters mounted thereon is provided, wherein a bare end of a splitter input fiber is routed via the slack storage system to a first end of the splice device, and wherein pre-connectorized splitter output fibers are routed to different adapters of the plurality of adapters.

15 Claims, 13 Drawing Sheets

(56) References Cited

U.S. PATENT DOCUMENTS

| | | | |
|---|---|---|---|
| 6,542,688 B1 | 4/2003 | Battey et al. | |
| 6,625,375 B1 | 9/2003 | Mahony | |
| 6,661,961 B1* | 12/2003 | Allen | G02B 6/445 |
| | | | 385/135 |
| 6,721,484 B1* | 4/2004 | Blankenship | G02B 6/445 |
| | | | 385/135 |
| 6,802,724 B1* | 10/2004 | Mahony | G02B 6/4451 |
| | | | 439/134 |
| 7,280,733 B2* | 10/2007 | Larson | G02B 6/3801 |
| | | | 385/134 |
| 7,333,709 B2 | 2/2008 | Carpenter | |
| 7,346,253 B2* | 3/2008 | Bloodworth | G02B 6/4453 |
| | | | 385/134 |
| 7,349,616 B1 | 3/2008 | Castonguay | |
| 7,751,674 B2* | 7/2010 | Hill | G02B 6/4454 |
| | | | 385/135 |
| 8,092,100 B2* | 1/2012 | Song | G02B 6/245 |
| | | | 385/134 |
| 8,929,708 B2 | 1/2015 | Pimentel et al. | |
| 9,481,129 B2* | 11/2016 | Verheyden | G02B 6/3833 |
| 9,817,195 B2* | 11/2017 | Menguy | G02B 6/3887 |
| 2004/0086252 A1* | 5/2004 | Smith | G02B 6/4453 |
| | | | 385/135 |
| 2005/0207711 A1* | 9/2005 | Vo | G02B 6/4451 |
| | | | 385/94 |
| 2006/0067637 A1 | 3/2006 | Carpenter | |
| 2006/0153362 A1 | 7/2006 | Bloodworth | |
| 2006/0153516 A1* | 7/2006 | Napiorkowski | G02B 6/445 |
| | | | 385/135 |
| 2007/0272440 A1* | 11/2007 | Grunwald | G02B 6/4448 |
| | | | 174/520 |
| 2008/0131132 A1* | 6/2008 | Solheid | G02B 6/4441 |
| | | | 398/117 |
| 2009/0097845 A1 | 4/2009 | Campbell | |
| 2010/0310222 A1 | 12/2010 | Zhou et al. | |
| 2011/0164854 A1 | 7/2011 | Desard et al. | |
| 2011/0262095 A1 | 10/2011 | Fabrykowski | |
| 2011/0268414 A1 | 11/2011 | Giraud | |
| 2012/0093473 A1* | 4/2012 | Cox | G02B 6/4452 |
| | | | 385/135 |
| 2012/0328258 A1 | 12/2012 | Barron | |
| 2013/0243386 A1 | 9/2013 | Pimentel et al. | |
| 2015/0355428 A1* | 12/2015 | Leeman | G02B 6/4455 |
| | | | 385/135 |

FOREIGN PATENT DOCUMENTS

| | | |
|---|---|---|
| DE | 102009008068 | 8/2010 |
| DE | 102011106987 | 1/2013 |
| EP | 1626300 | 2/2006 |
| EP | 2674800 | 12/2013 |
| JP | 2004-246147 | 9/2004 |
| JP | 2004-333835 | 11/2004 |
| JP | 2005-189438 | 7/2005 |
| JP | 2005-191211 | 7/2005 |
| WO | WO 97/29395 | 8/1997 |
| WO | WO 2006-036438 | 4/2006 |
| WO | WO 2010/077856 | 7/2010 |
| WO | WO 2014-186433 | 11/2014 |

OTHER PUBLICATIONS

Supplementary European Search Report for Appl. No. EP15800100.8, dated Jan. 4, 2018, 3 pp.

\* cited by examiner

FIBER MANAGEMENT ASSEMBLIES AND NETWORK INTERFACE DEVICES INCORPORATING SUCH ASSEMBLIES

FIELD

The present description relates to fiber management assemblies and network interface devices for use in telecommunications that incorporate such assemblies.

BACKGROUND

Telecommunication cables are used for distributing data across vast networks. As telecommunication cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines. At each point where the cable is opened, it is necessary to provide some type of enclosure to protect the cable (and potentially unjacketed fiber) and allow easy and repeated access to the cable, such that technicians may easily access the cable to provide necessary services, the link may be tested, and so that one installation crew may install a drop line to the device, while another completes the link inside the home to the subscriber optical network unit.

Enclosures for both electrical and optical telecommunication cables are generally known. For example, there are enclosures that receive one or more cables and contain some form of cable connection. Such enclosures often also contain storage means for storing unused conductive wires or optical fibers waiting for subsequent use. In some enclosures, splices in the cable and connection devices intended for subsequent connection to drop wires are maintained in separate areas of the enclosure, so as to reduce the possibility of damaging or disrupting cable splices during re-entry into the enclosure when connecting drop lines or the like. Terminals or closures positioned at a final residential unit, likely a simplex or duplex home, are sometimes termed network interface devices.

SUMMARY

In one aspect, the present description relates to a fiber management assembly. The fiber management assembly comprises an optical fiber splitter, a splice holding section having a fiber splice device mounted therein, and a slack storage system. The optical fiber splitter, splice holding section and slack storage system are disposed on one of a tray and an interior surface of an enclosure body. In addition, patch panel tray having a patch panel comprising a plurality of adapters mounted thereon is provided, wherein a bare end of a splitter input fiber is routed via the slack storage system to a first end of the splice device, and wherein pre-connectorized splitter output fibers are routed to different adapters of the plurality of adapters.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
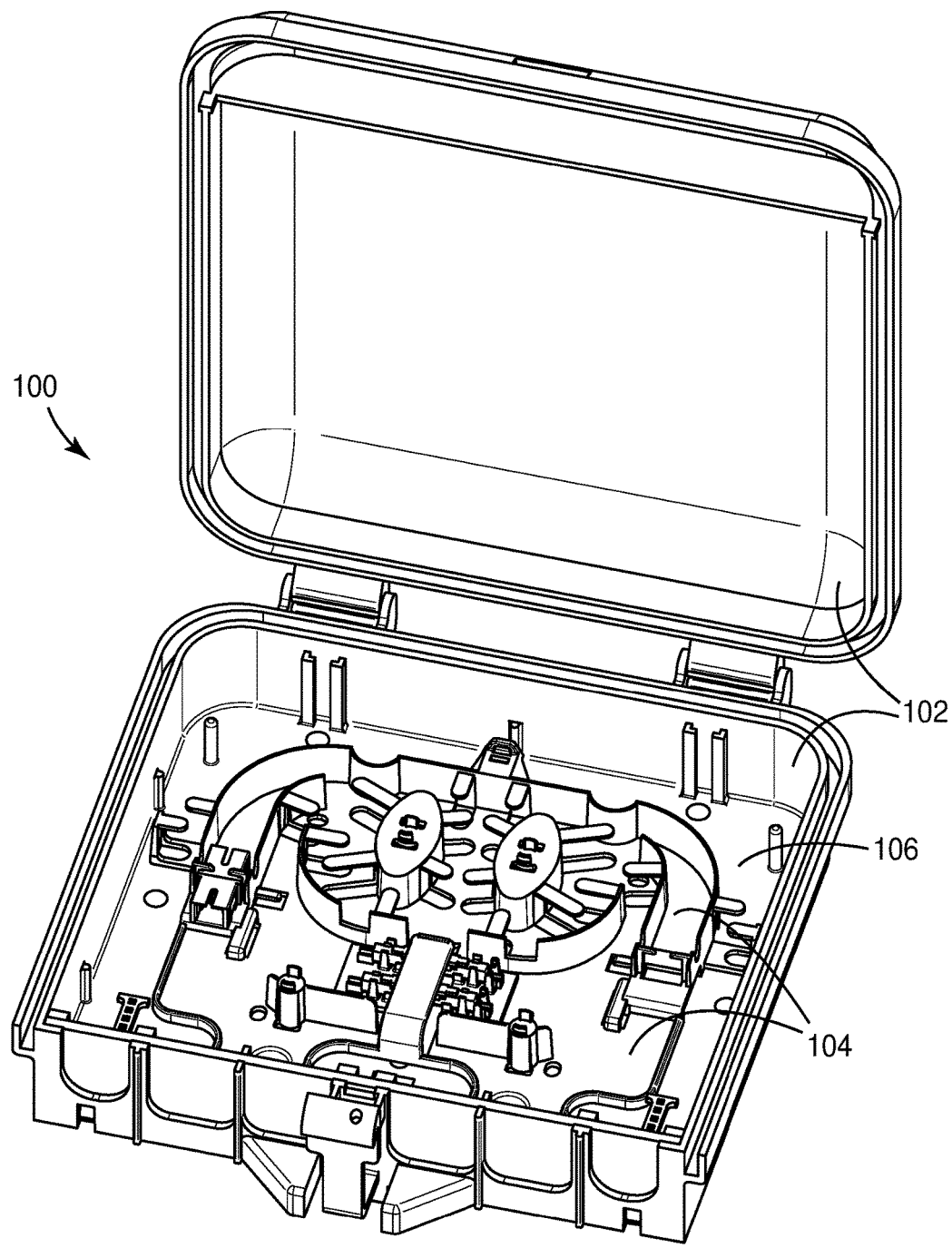
FIG. 1 is a perspective view of a network interface device according to an aspect of the present invention.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "coupled with" or "in contact with" another element, component or layer, it can be directly on, directly coupled with, in direct contact with, or intervening elements, components or layers may be on, connected, coupled or in contact with the particular element, component or layer, for example. When an element, component or layer for example is referred to as being "directly on," "directly coupled with," or "directly in contact with" another element, there are no intervening elements, components or layers for example.

The present invention relates to a demarcation box or network interface device or network interface unit (referred to herein simply as network interface device or NID) configured for distributed splitting. In one aspect, the network interface device can include a fiber management assembly having a splitter or splitter module disposed in an enclosure body. In one aspect, the fiber management assembly includes a mechanical splice and actuation system. The fiber management assembly can be modular and can be provided on a tray that can be easily inserted in the enclosure body of the network interface device. Accordingly, various aspects of the present invention allow for the use of a splitter to direct signal transmitting through an outside plant drop cable terminated to a plurality or indoor or indoor/outdoor cables connecting to an optical network terminal disposed inside the premise or premises of a customer or multiple customers. This system allows for the reduction of splice points through the use of distributed splitting.

Figure 11A:
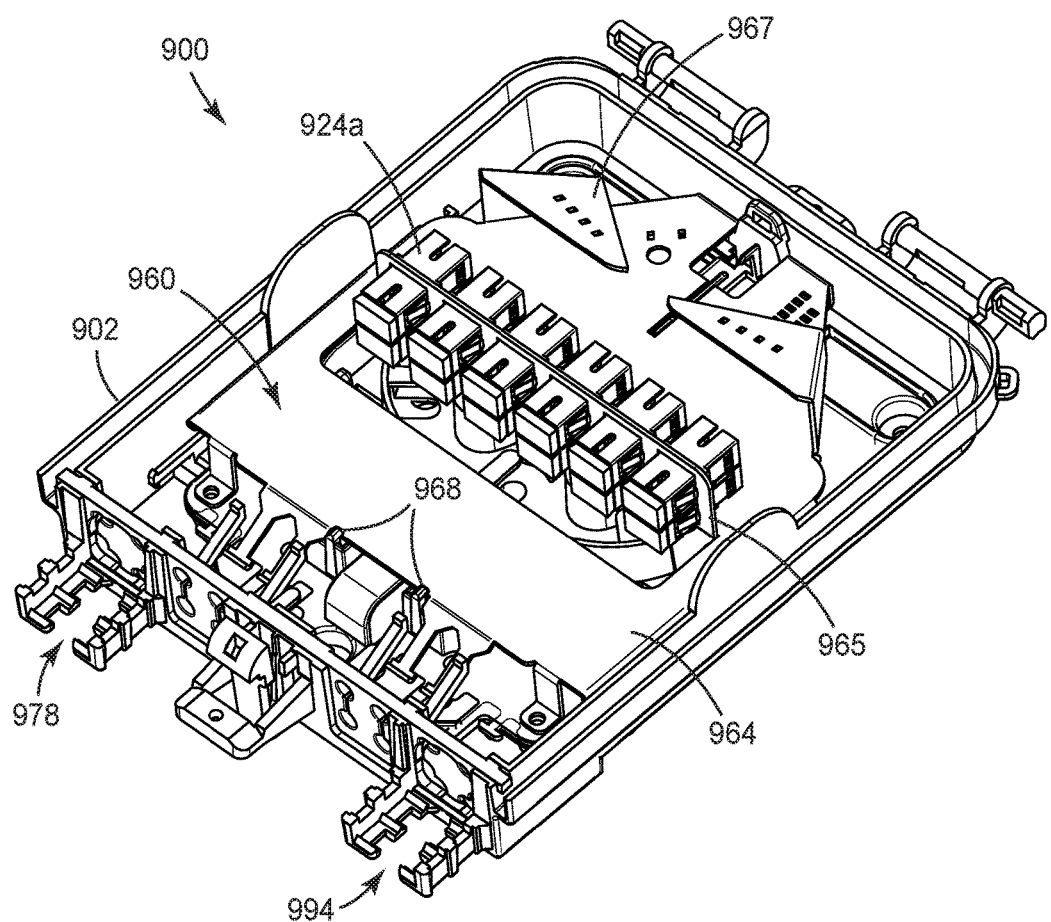
FIGS. 11A, 11B, and 11C respectively show perspective views and an exploded view of a network interface device according to an aspect of the present invention.
Figure 11B:
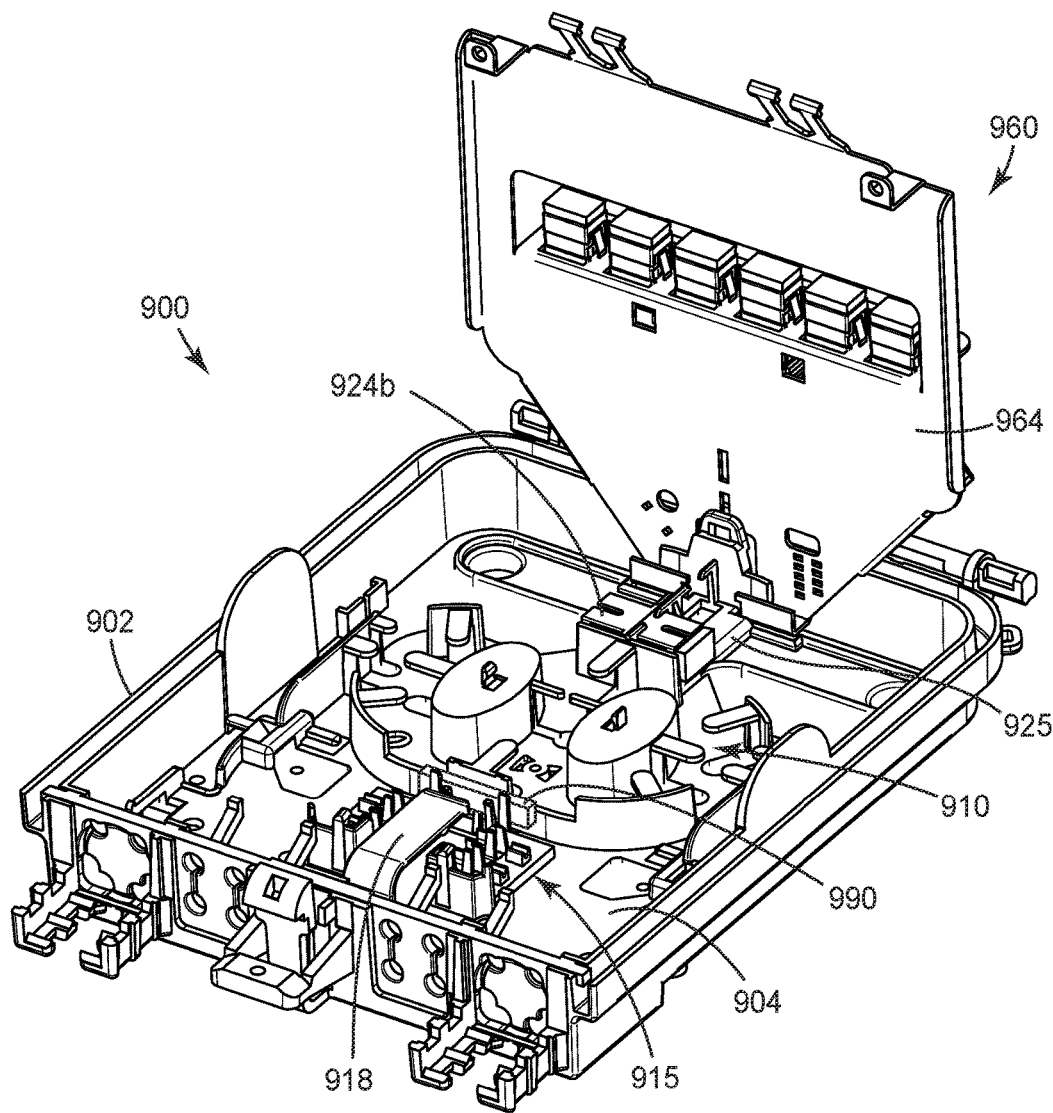
Figure 11C:
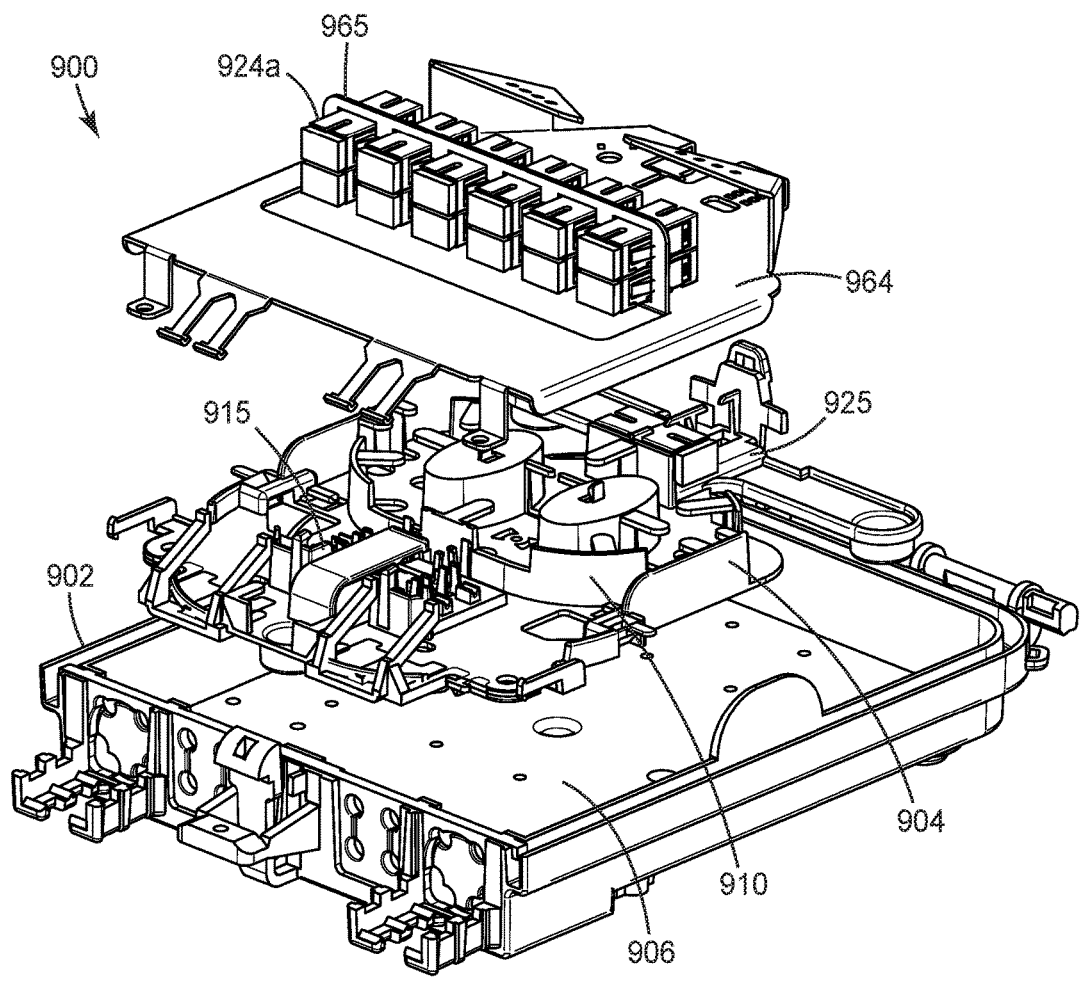

In one aspect of the invention, FIGS. 11A-11C show a network interface device 900 that is configured for distributed splitting. NID 900 includes a pre-installed splitter and patch panel for multi-subscriber and/or multi-dwelling applications. As shown in FIG. 11A, a network interface device 900 includes a patch panel assembly 960 having a patch panel tray 964, protective tabs 967 (to protect fibers routed to the patch panel), and a patch panel frame 965 disposed within an enclosure body 902. Releasable latches 968 can be provided to maintain the position of the patch panel tray 964. The tray 964 can be constructed from a standard material, such as metal or plastic.

Patch panel frame 965 can accommodate multiple adapters 924a arranged in rows. While twelve adapters are shown in FIG. 11A, patch panel assembly 960 can be configured (e.g., sized) to accommodate a smaller or greater number of adapters. With multiple adapters housed within network interface device 900, multiple subscribers can be serviced from the same device.

In one aspect, as shown in FIG. 11B, patch panel tray 964 is pivotably mounted to a fiber management tray 904, which is in turn mounted onto (or, alternatively, formed on) an interior surface 906 of the enclosure body 902. As shown in FIGS. 11B and 11C, fiber management tray 904 can include various fiber management areas, such as slack storage 910, fiber splice holding section 915, and adapter holding section 925. Each of these fiber management areas can be constructed the same as those like-numbered fiber management areas and components described in greater detail below.

In addition, fiber management tray 904 can also house a splitter 990, such as a 1×4, 1×8, or 1×16 optical fiber splitter, or a combination of splitters (e.g., a 1×4 and 1×8 splitter would accommodate the connection of up to twelve subscribers), depending on the application. The splitter 990 can be a conventional optical fiber splitter, and can include a single input fiber and multiple pre-connectorized output fibers.

As shown in FIG. 11B, splitter 990 is mounted onto tray 904 adjacent to the splice holding section 915. In operation, a drop cable fiber (not shown in FIG. 11B, but see fiber 242 from FIG. 5) is routed to a first end of a splice device mounted in the splice holding section 915 and the bare end of the splitter input fiber (not shown) is routed (via slack storage system 910) to a second end of the splice device. The splitter input fiber can be pre-installed in a splice device, such as a mechanical splice, described in further detail herein. The pre-connectorized output fibers can be routed to different adapters that are pre-installed in the patch panel 965. Further adapters 924b can also be included in adapter holding section 925. Additionally, a fiber splice actuation mechanism 918 is positioned over the mechanical fiber splice device. As described in further detail herein, the fiber splice actuation mechanism 918 is capable of actuating the mechanical fiber splice by pressing on the actuation mechanism. Pre-installation of the splitter fibers prior to splice actuation allows an installer to avoid torsion effects on the optical fibers. Subsequently, multiple subscriber home run drop fibers/cables (being pre-connectorized or field mounted onto connectors) can be connected to the patch panel, as appropriate.

Thus the network interface device 900 shown in FIGS. 11A-11C provides a demarcation box with fully integrated fiber management, and can accommodate at least one drop cable and connectorization/anchoring capacity for up to twelve pre-connectorized or field terminated cables.

As mentioned above, the network interface device includes a fiber management assembly. FIG. 1 provides one example fiber management assembly structure, a fiber management tray 104 mounted in a network interface device 100 according to another aspect of the present description. Network interface device 100 generally includes an enclosure body 102 and a tray 104. Tray 104 is securely mounted to an interior surface 106 of the enclosure body, and includes a number of fiber management components. Various versions of such a tray, as described herein, and tray assemblies (i.e. a tray and components mounted thereon or routed therethrough) fall within the scope of the present invention. In a further aspect, the tray can be omitted and the fiber management components can be mounted and/or formed onto an interior surface or surfaces of the enclosure body, such as interior surfaces 106, 206, 706 (also see FIGS. 5 and 9, described in more detail below).

Figure 2:
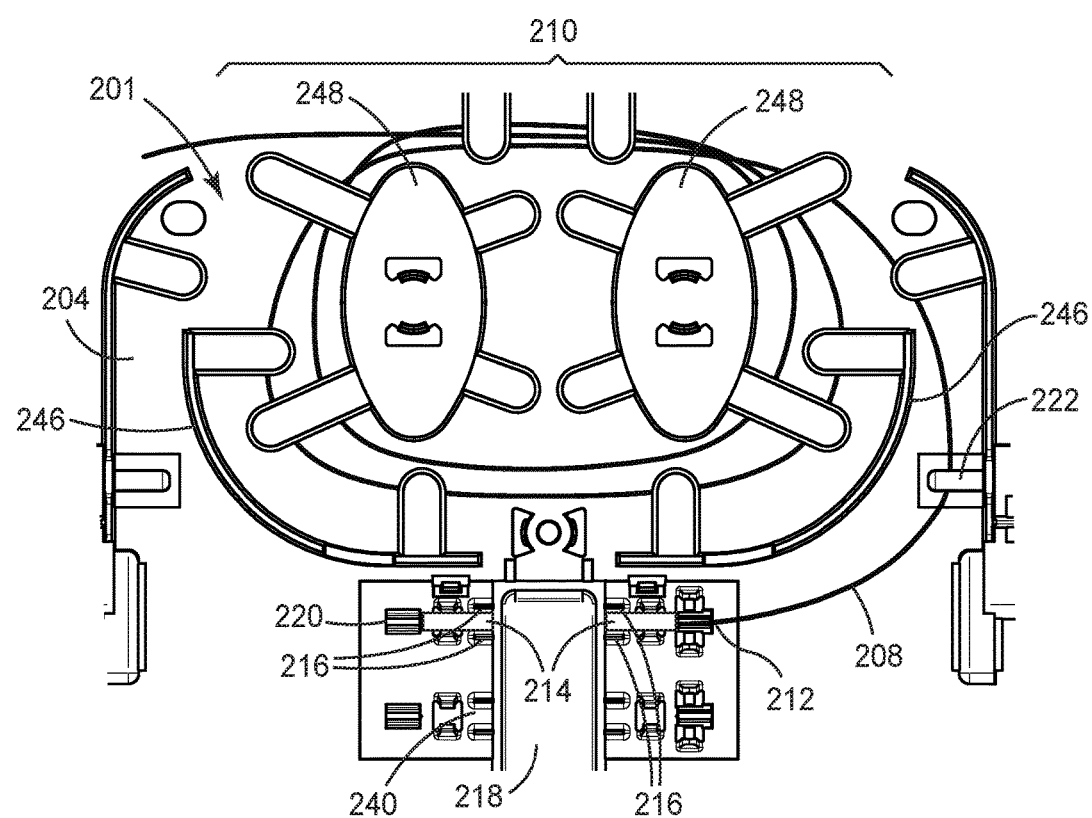
FIG. 2 is a top view of a fiber management tray assembly according to an aspect of the present invention.

FIG. 2 illustrates another fiber management tray assembly according to the present description. Fiber management tray assembly 201 includes a first optical fiber 208 that is stored in loops around a slack storage system 210 in tray 204. The tray 204 can be constructed from a standard material, such as metal or plastic. Preferably, the tray is constructed from a molded plastic material, e.g., a suitable polymer material, such as polycarbonate, polyamide, polypropylene, polyethylene or the like.

In one exemplary embodiment, optical fiber 208 may comprise a standard single mode or multimode optical fiber, such as SMF 28 (available from Corning Inc.). In an exemplary embodiment, the optical fiber has a 900 μm outer diameter buffer coating (not including standard fiber jacketing), although optical fiber 208 can comprise any standard optical fiber buffered diameter, such as 250 μm, or fiber buffered diameters larger or smaller.

The first end of the optical fiber 208 is pre-installed in a first mechanical fiber splice device 214. First mechanical fiber splice device 214 is securely mounted in a first fiber splice holding groove 216 that is integrally formed in tray 204. The first mechanical fiber splice device receives the first end 212 of the optical fiber after routing through the slack storage system. Additionally, a fiber splice actuation mechanism 218 is positioned over the first mechanical fiber splice device 214. The fiber splice actuation mechanism 218 is capable of actuating the first mechanical fiber splice 214 by pressing on the actuation mechanism. In one embodiment, the fiber splice actuation mechanism comprises a flexible cantilevered arm that is integral to the tray. A perspective view more clearly illustrating this element may be found in FIG. 4. Pre-installing the optical fiber 208 in the tray in the slack storage system 210 prior to splice actuation allows an installer to avoid torsion effects on the optical fiber.

Although not shown in FIG. 2, a splitter holding section for holding a splitter, such as splitter 990 described herein, can also be provided on tray 204.

Additionally, fiber management tray assembly may include, as part of the fiber splice holding groove 216, an alignment channel 220 that facilitates optical fiber insertion into the first mechanical fiber splice device 214. The mechanical fiber splices described herein may be, e.g., 3M™ FIBRLOK™ II mechanical fiber optic splice device, available from 3M Company, of Saint Paul, Minn., or another conventional mechanical splice device.

Further, the splice holding groove(s) and alignment channel(s) may be formed as part of a splice holding section, which can be integrally formed onto tray 204, or provided as a separate splice insert mountable to the tray 204. In this manner, different splice inserts can be utilized to accommodate different types of mechanical splices or, in alternative aspects, fusion splices.

Additionally, slack storage system 210 may include at least one fiber stay 222. Fiber stay 222 is positioned to ensure that the fiber 208 will remain in position, even when a mechanical splice device (such as first mechanical fiber splice device 214) is unactuated. Fiber stay 222 may, in some embodiments, be integrally formed in the tray and may, for example, be a plastic tab. Slack storage system 210 includes containment walls 246 that partly surround the system and provide a barrier from the mechanical splice device or devices. The system further includes dual hubs 248 around which the optical fiber 208 is routed, that provide for a minimum bend radius and also may, in certain embodiments, allow for figure-8 routing of the optical fiber.

Figure 3:
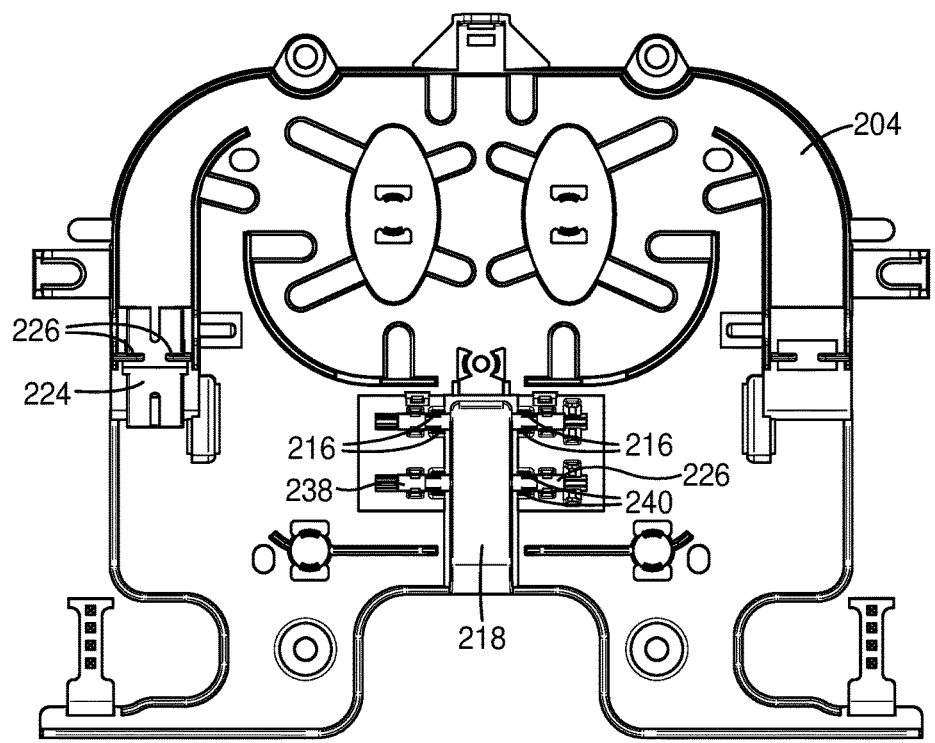
FIG. 3 is a top view of a fiber management tray assembly according to an aspect of the present invention.
Figure 4:
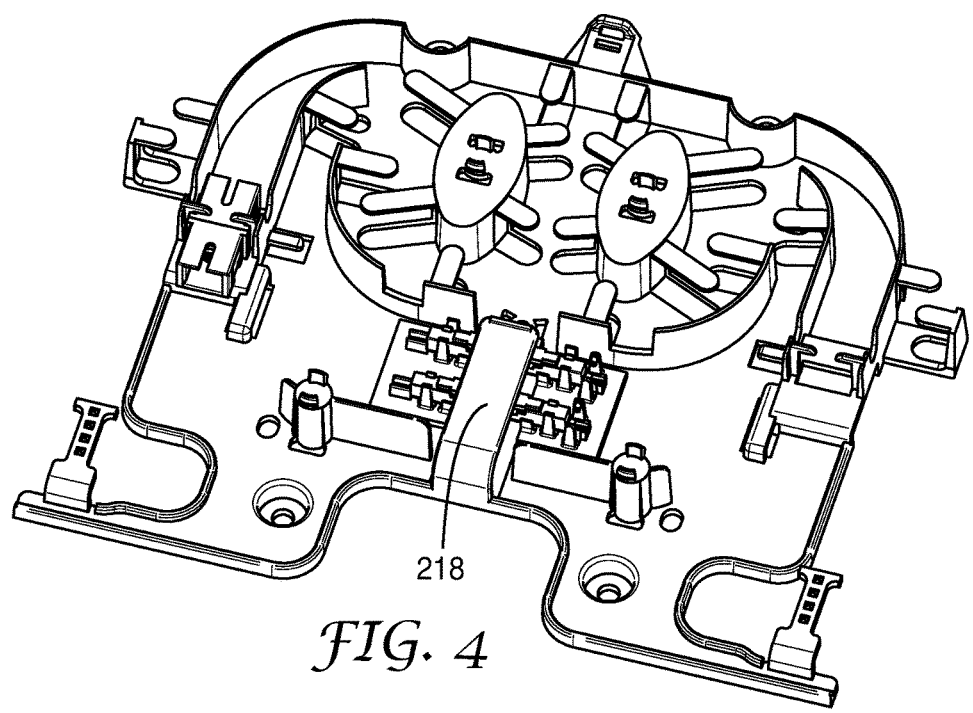
FIG. 4 is a perspective view of a fiber management tray assembly according to an aspect of the present invention.

FIG. 3 illustrates some further aspects of potential embodiments of fiber management trays according to the present description. Though not all elements from FIG. 2 are included, they may also be included along with the elements described. Fiber management tray assembly further includes an adapter 224. Adapter 224 is mounted in a first adapter mounting mechanism 226 that is integrally formed in the tray. Adapter 224 is generally capable of receiving and coupling two connectors. For further understanding, FIG. 4 provides a perspective view of the construction shown in FIG. 3.

Figure 5:
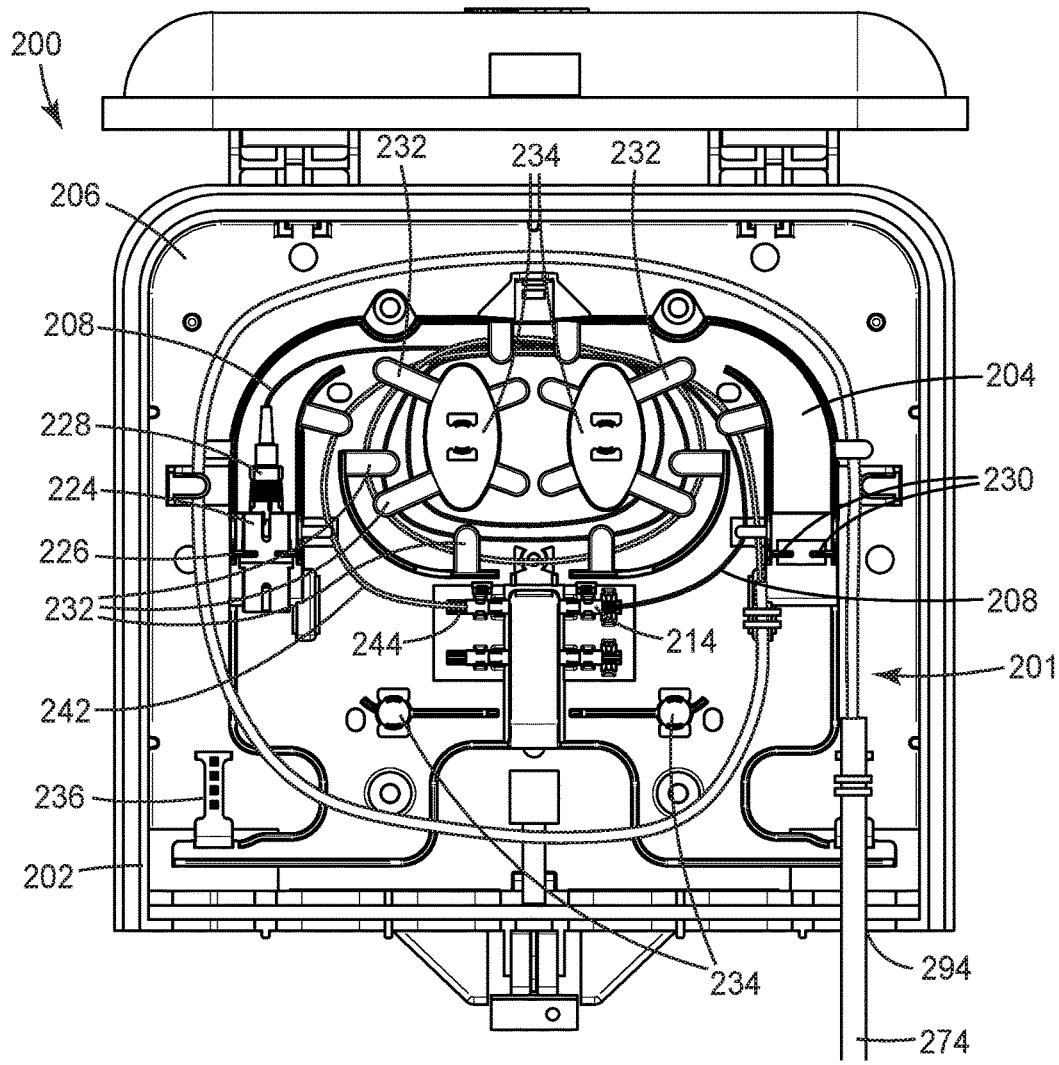
FIG. 5 is a top view of a fiber management tray assembly according to an aspect of the present invention.

The invention may be further understood by reference to FIG. 5, which shows a network interface device 200 having an enclosure body 202 that houses tray assembly 201. Further, FIG. 5 illustrates that the fiber management tray assembly may include a first connector 228 that is connected to the adapter 224. Second end of the first optical fiber 208 is installed in the first connector 228, such that optical fiber (potentially pigtail) 208 is routed from connector 228, looped around the slack storage system 210, and ultimately reaches first mechanical fiber splice 214. Where a fiber pigtail is used, the fiber pigtail end can be stripped and cleaved (flat or angled), or otherwise suitably prepared. Thus, connectors can be pre-installed into the adapter with a desired length of pigtail fiber exiting from the back end of the connector, where the end of that pigtail fiber can be prepared for splicing and inserted part way into the splice device. According to an exemplary embodiment, this initial connectorization can be completed in the factory, prior to field termination.

Connectors used herein, such as first connector 228, can include one or several different types of standard optical connectors, such as SC-type, FC-type, LC-type, and ST-type connectors. For example, when coupling into existing analogue/digital optical distribution cables, an exemplary SC-APC (angle polished connector) connector can be employed.

Figure 9:
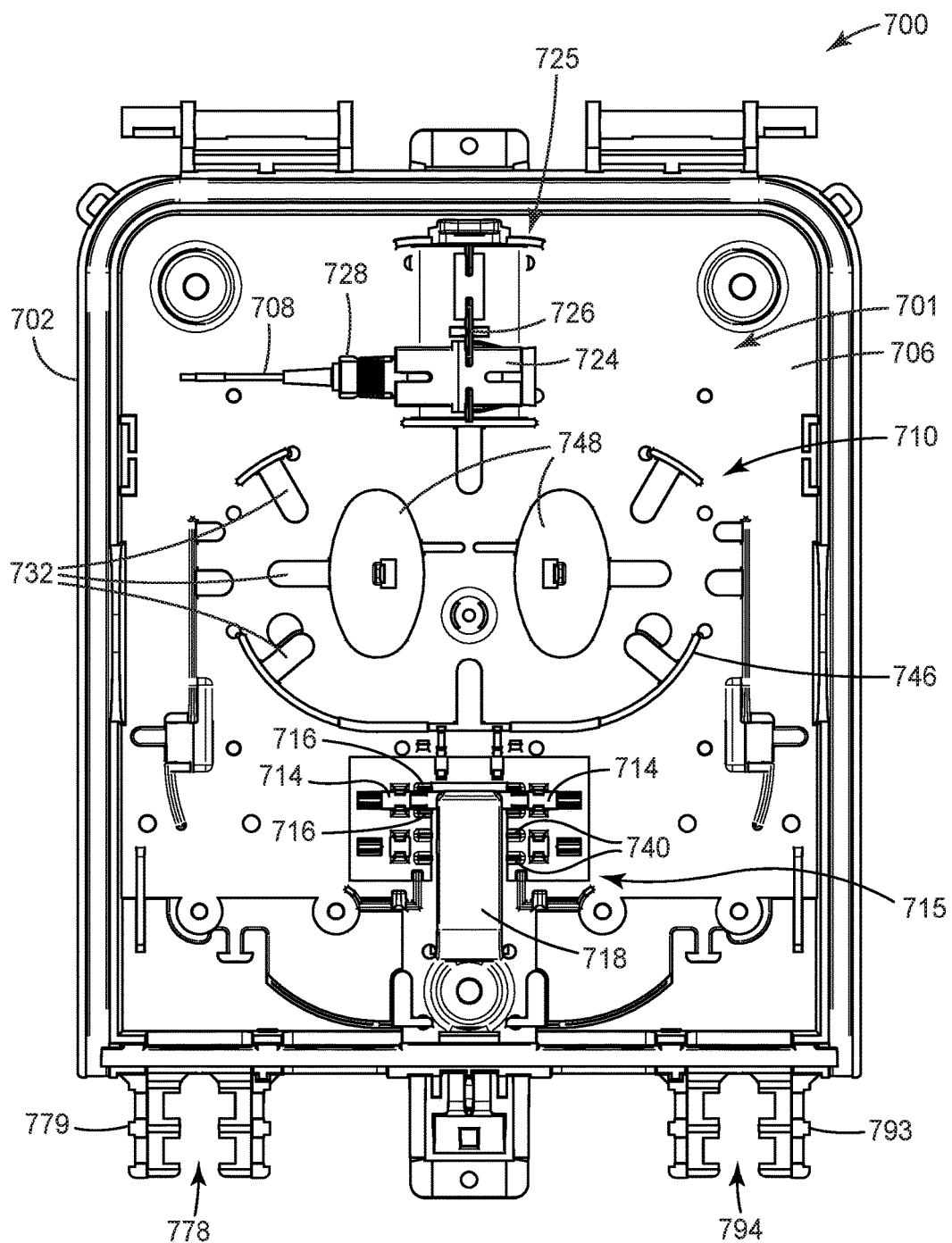
FIG. 9 is a top view of a network interface device according to an aspect of the present invention.

The fiber management assembly may additionally include a second adapter mounting mechanism 230 that is integrally formed in the tray 204. Though not shown, a second adapter may be mounted into second adapter mounting mechanism 230. The first and second adapter mounting mechanisms may be, as illustrated in FIG. 5, on opposing sides of tray 204. Alternatively, the adapter mounting mechanisms can be disposed adjacent each other on the same area of the tray. For example, such as shown in FIG. 9, the adapter mounting mechanisms can be mounted above the slack storage and opposite the fiber splice holding section.

Another potential feature of the fiber management tray is the inclusion of a plurality of protective tabs 232 that are positioned over the slack storage system. Protective tabs aid to both ensure that optical fiber (e.g. pigtails) and potentially exposed optical fiber from the drop cable routed through the slack storage system 210 are secured within the slack storage system, and also protects the potentially exposed fibers from tangling with the subscriber cable. As a layer of further protection, the fiber management tray may include a protective cover that is removably positioned over the tray and protects the first connector 228 and first mechanical fiber splice device 214, as well as offering further protection to fiber 208. This protective cover (not shown) may be transparent and contain holes that snap in to connect with the tray's integral anchor points 234.

Tray assembly 201 may further include a strain relief device 236. Strain relief device 236 may be integral to the tray and is capable of providing strain relief to a drop cable or subscriber cable that travels over the tray. It may be positioned most appropriately near an entry port, where the tray is positioned in an enclosure. Looking to FIG. 6, subscriber cable 280, which can originate in a customer's premises, may enter an enclosure at an inlet port 278. Before the cable is ultimately secured to the strain relief device 236 by e.g., a zip or cable tie, or other fastener, a second connector 241 at the end of the subscriber cable 280 is connected to adapter 224 in order to connect to first connector 228 and optical fiber 208. Appropriate subscriber cables for use in the present invention may be e.g., EZ-Bend® cables from OFS (Norcross, Ga.), such as EZ-Bend 4.8 mm or 3.0 mm cables.

Returning to FIG. 3, tray assembly may further include a second mechanical fiber splice device 238 that is securely mounted in a second fiber splice holding groove 240. Fiber splice holding groove 240 (shown unobstructed in FIG. 2) is integrally formed in the tray 204 and runs parallel to the first fiber splice holding groove 216. Where a second mechanical fiber splice device is present, fiber splice actuation mechanism 218 may be used to actuate both the first mechanical fiber splice device and second mechanical device. The two mechanical fiber splice mechanisms may be actuated serially or sequentially.

Returning to the fiber management tray assembly 201 illustrated in FIG. 5, tray 204 may also include a second optical fiber 242. Second optical fiber 242 may be routed to the opposing side 244 of first mechanical fiber splice device 214 from which the first optical fiber 208 terminates. Second optical fiber may be a 900 µm outer diameter buffered cladding (not including standard fiber jacketing), or could be a standard optical fiber buffered diameter, such as 250 µm, or fiber buffered diameters larger or smaller.

As noted with respect to FIG. 1, and illustrated again in FIG. 5, the tray 204 and tray assemblies described herein may be securely mounted to an interior surface 206 of an enclosure body 202. The entire construction of the enclosure with incorporated tray assembly may be understood as a network interface device.

Figure 7:
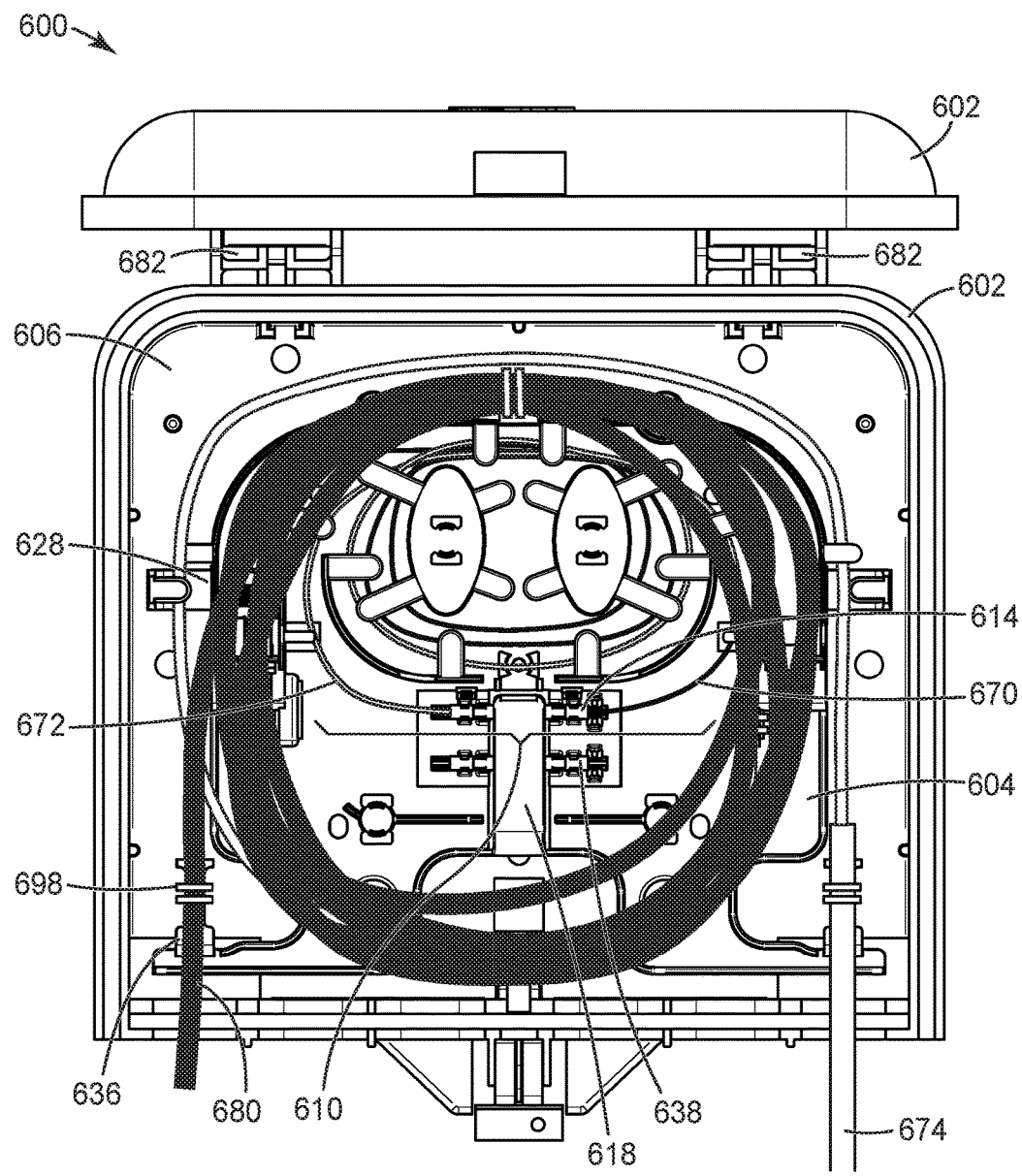
FIG. 7 is a top view of a network interface device according to an aspect of the present invention.
Figure 8:
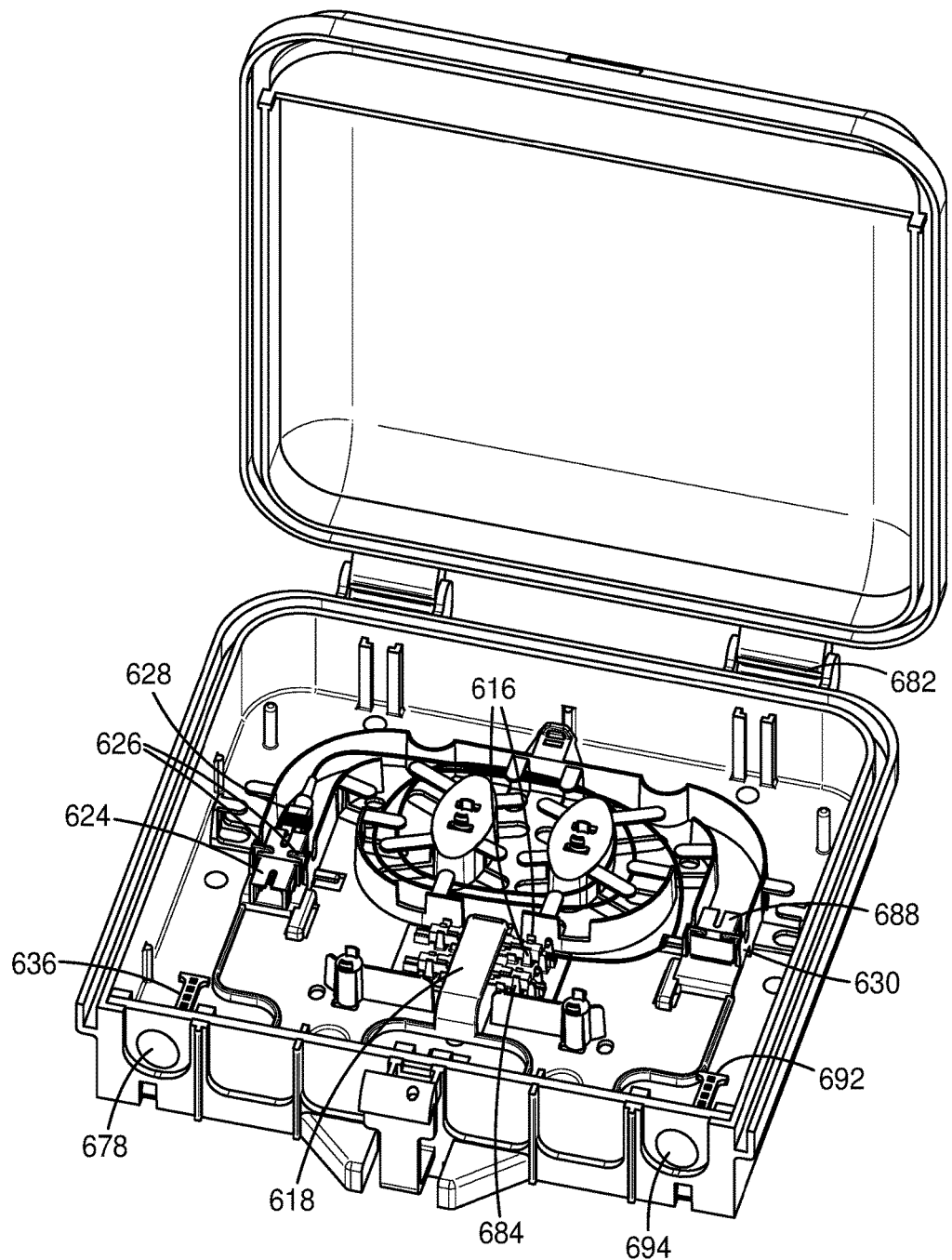
FIG. 8 is a perspective view of a network interface device according to an aspect of the present invention.

FIGS. 7 and 8 show different aspects of the present description. FIG. 7 shows a top view of network interface device 600 that includes an enclosure body 602. Enclosure body 602 may be made of any number of appropriate materials, such as an appropriate molded plastic. In at least one embodiment, the enclosure body may be opened and closed by a hinge mechanism 682. Network interface device 600 further includes a tray 604 that is securely mounted to an interior surface 606 of the enclosure body. The tray may include (as illustrated in the version of network interface device in FIG. 8, with elements removed for ease of illustration), a first adapter mounting mechanism 626 integrally formed in the tray, and an adapter 624 mounted into the mounting mechanism. Additionally, the tray includes a first fiber splice holding groove 616 that is integrally formed in the tray, and a fiber splice actuation mechanism 618 that is positioned over the first fiber splice holding groove 616. Finally, the tray 604 includes a slack storage system 610.

Network interface device 600 further includes a first connector 628 that is connected to the adapter 624. The first connector includes a first fiber pigtail 670 that extends from it. As illustrated in FIG. 7, both fiber pigtail 670 and an optical fiber 672 from a drop cable 674 are routed around the slack storage system 610. First mechanical fiber splice device 614 is securely mounted in the first fiber splice holding groove 616, where the fiber splice actuation mechanism 618 is also positioned over the first mechanical fiber splice device 614. Fiber splice actuation mechanism is capable of actuating the first fiber splice device by pressing on the actuation mechanism. Finally, though not shown, network interface device may include a protective cover (potentially transparent, e.g., a clear plastic cover) that is removably positioned over the tray and protects the first connector and first mechanical fiber splice device.

Additional elements may also be present in network interface device 600. For example, the tray 604 may include a strain relief device 636 that is positioned proximate an entry port 678 into which the drop cable or subscriber cable 680 enters the enclosure. Subscriber cable 680 may be secured to the strain relief device using a cable tie or zip tie 698. Tray may include a second fiber splice holding groove 684 that is positioned adjacent to and runs parallel to the first fiber splice groove 616. Network interface device 600 may include a second mechanical fiber splice device 638 that is securely mounted in second fiber splice holding groove 684. The fiber splice actuation mechanism 618 is positioned over the second mechanical fiber splice device, and is capable of actuating the second fiber splice device by pressing on the actuation mechanism.

Network interface device 600 may include a second adapter 688 mounted in a second adapter mounting mechanism 630 in the tray. The first and second adapter mounting mechanisms may be positioned on opposing sides of the tray in one preferred embodiment. In such an embodiment, first mechanical fiber splice device may be positioned generally between the first and second adapter mounting mechanisms.

Additionally, tray 604 may include a second strain relief device 692. Second strain relief device 692 may be positioned on an opposing side of the tray 604 from the strain relief device 636. Second strain relief device 692 is positioned proximate a second entry port 694 through which a drop cable or subscriber cable may enter the network interface device.

Although not shown in FIG. 7, a splitter holding section for holding a splitter, such as splitter 990 described herein, can also be provided on tray 604.

Figure 6:
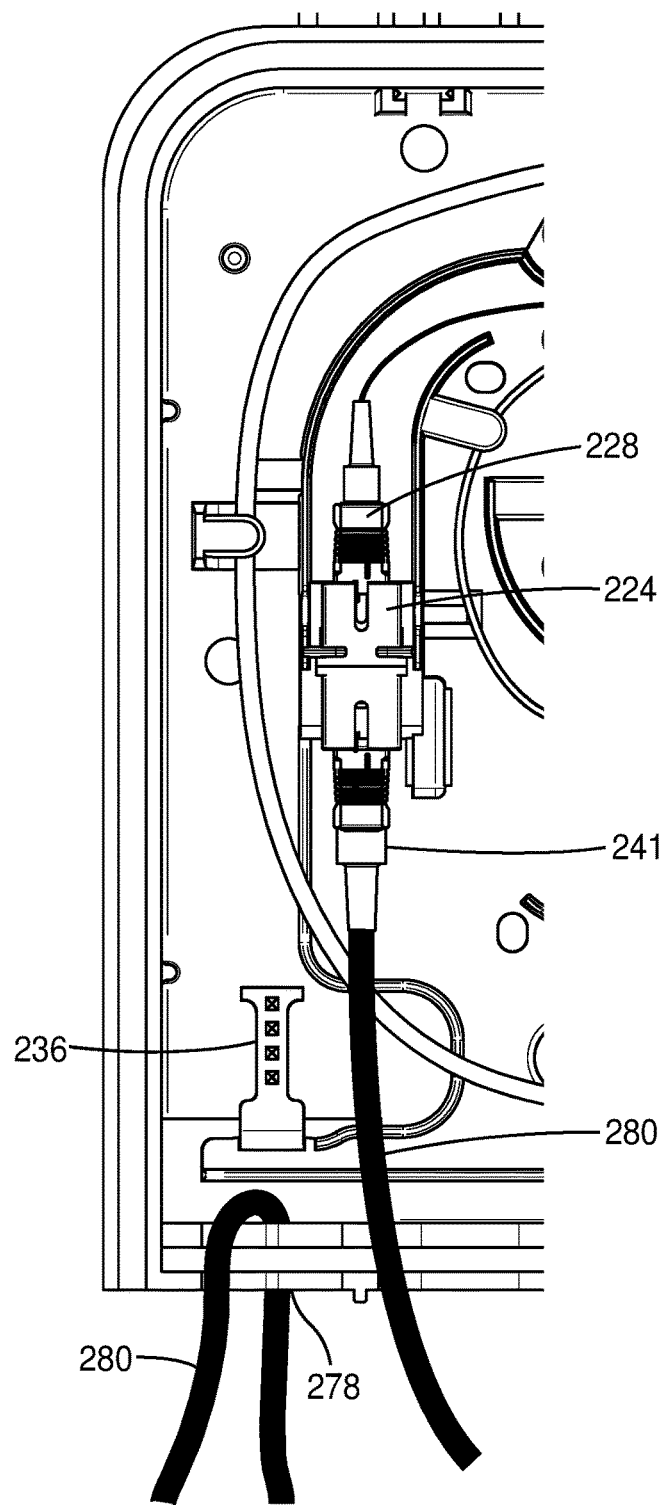
FIG. 6 is close-up top view of a portion of a device according to an aspect of the present invention.

It should further be noted that the progression of FIGS. 5 through 7 offers a helpful understanding of the fiber management tray assemblies described herein. In FIG. 5, the fiber management tray assembly includes the drop cable 274 that enters second inlet port 294, where the cable is routed through the slack storage system after optical fiber is removed and exposed as optical fiber 242. This fiber is spliced at first mechanical fiber splice device to optical fiber 208 which terminates at connector 228 disposed in adapter 224. As illustrated in FIG. 6, a subscriber cable 280 may be routed to the tray (potentially through an inlet port 278 where the tray is housed in an enclosure) and connected via connector 241 to adapter 224. This provides the ultimate connection between the subscriber and drop cables. As further provided in FIG. 7, each of the subscriber and drop cables may be coiled within the enclosure and secured by strain relief devices at the inlet ports and cable management structures and or ties within the enclosure.

An alternative aspect of the present invention is shown FIG. 9, where a tray is omitted, and the fiber management components are formed on an interior surface of the enclosure body. For example, FIG. 9 shows a network interface device 700 having an enclosure body 702 with an interior surface 706. A fiber management assembly 701 having various fiber management areas, such as slack storage system 710, fiber splice holding section 715, and adapter holding section 725, can each have their components integrally formed onto interior surface 706.

Similar to the assemblies described above, a first optical fiber 708 (only a portion of which is shown for simplicity) can be stored in slack storage system 710. The fiber can comprise any of the fibers described above. A first end of the optical fiber 708 can be pre-installed in a first mechanical fiber splice device 714 that is securely mounted in a first fiber splice holding groove 716 disposed in the splice holding section 715. The first mechanical fiber splice device receives the first end of the optical fiber after routing through the slack storage system. Additionally, a fiber splice actuation mechanism 718, which is configured and operates in a pressing manner similar to that described above, can be provided and positioned over the first mechanical fiber splice device 714. As with previously described embodiments, pre-installing the optical fiber 708 in the in the slack storage system 710 of the fiber management assembly 701 prior to splice actuation allows an installer to avoid torsion effects on the optical fiber. A second mechanical splice device (not shown) may also be installed in splice holding section 715.

Additionally, fiber management assembly 701 may include, as part of the fiber splice holding section 715, an alignment channel that facilitates optical fiber insertion into the first mechanical fiber splice device 714. The mechanical fiber splices described herein may be, e.g., 3M™ FIBR-LOK™ II mechanical fiber optic splice device, available from 3M Company, of Saint Paul, Minn., or another conventional mechanical splice device.

Further, the splice holding groove(s) and alignment channel(s) may be formed as part of splice holding section 715 or may be provided as a separate splice insert mountable in splice holding section 715. In this manner, different splice inserts can be utilized to accommodate different types of mechanical splices.

Although not shown in FIG. 9, a splitter holding section for holding a splitter, such as splitter 990 described herein, can also be provided as part of fiber management assembly 701.

Additionally, slack storage system 710 may include at least one fiber stay, such as those described above. Slack storage system 710 includes containment walls 746 that partly surround the slack storage system and provide a barrier from the mechanical splice device or devices. The slack storage system further includes dual hubs 748 around which the optical fiber 708 is routed, that provide for a minimum bend radius and also may, in certain embodiments, allow for figure-8 routing of the optical fiber.

Fiber management assembly 701 further includes one or more adapters disposed in an adapter holding section 725. For example, a first adapter, such as adapter 724, can be mounted in a first adapter mounting mechanism 726 that is integrally formed in the adapter holding section. Adapter 724 is generally capable of receiving and coupling two connectors. A first connector 728 can be connected to the adapter 724. Connector 728 can comprise any of the connectors described previously. The second end of the first optical fiber 708 is installed in the first connector 728, such that optical fiber (potentially pigtail) 708 is routed from connector 728, looped around the slack storage system 710, and ultimately reaches first mechanical fiber splice 714. Where a fiber pigtail is used, the fiber pigtail end can be prepared as described above. Thus, connectors can be pre-installed into the adapter with a desired length of pigtail fiber exiting from the back end of the connector, where the end of that pigtail fiber can be prepared for splicing and inserted part way into the splice device. According to an exemplary embodiment, this initial connectorization can be completed in the factory, prior to field termination.

Fiber management assembly 701 may additionally include a second adapter mounting mechanism that is integrally formed in the adapter holding section 725 for holding a second adapter (not shown). The first and second adapter mounting mechanisms may be disposed adjacent each other in the adapter holding section.

The fiber management assembly 701 may further include a plurality of protective tabs 732 that are positioned over the slack storage system 710 to help ensure that optical fiber (e.g. pigtails) and potentially exposed optical fiber from the drop cable routed through the slack storage system 710 are secured within the slack storage system, similar to tabs 232 described previously. A protective cover, similar to that described above, may also be included.

Fiber management assembly 701 may further include a strain relief device that is capable of providing strain relief to a drop cable or subscriber cable that travels within the assembly. It may be positioned most appropriately near an entry port, such as entry ports 778 and 794. For example, FIG. 9 shows strain relief structures 779 and 793 disposed on an exterior surface of enclosure body 702 at the ports.

Internal strain relief structures can also be provided within the enclosure body as previously described. In one aspect, a subscriber cable may enter network interface device 700 at inlet port 778. Before the cable is ultimately secured to the strain relief device by e.g., a zip or cable tie, or other fastener, a second connector at the end of the subscriber cable can be connected to adapter 724 in order to connect to first connector 728. Appropriate subscriber cables are described previously.

A cover (not shown) can be hingedly mounted as part of the enclosure body to provide further protection to the fibers and fiber management components disposed in the network interface device 700.

Figure 10A:
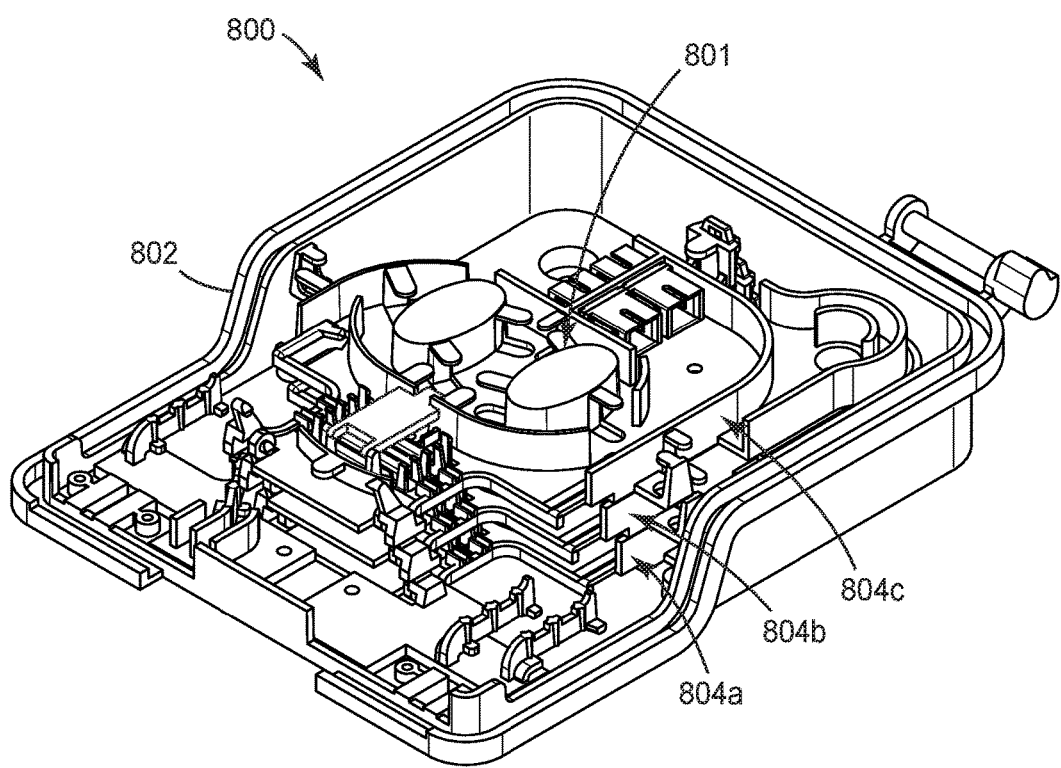
FIGS. 10A and 10B respectively show a perspective view and an exploded view of a network interface device according to an aspect of the present invention.
Figure 10B:
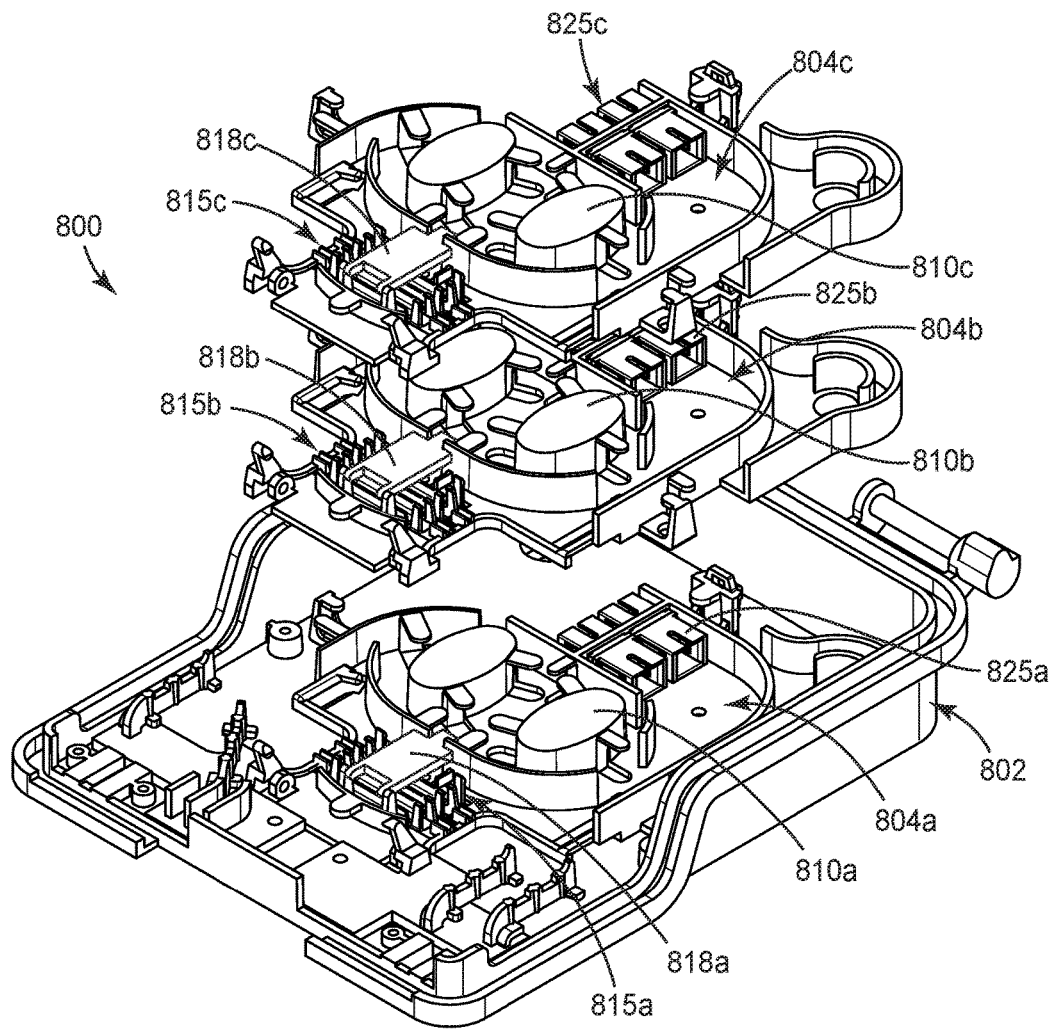

In another aspect of the invention, as shown in FIGS. 10A and 10B, a network interface device 800 can include multiple trays for fiber management and routing. For example, FIG. 10A shows network interface device 800 having a tray assembly 801 mounted within enclosure body 802 that includes three fiber management trays 804a, 804b, and 804c in a stacked arrangement. Thus, with the stacked tray arrangement, multiple subscribers (e.g., within a single dwelling, or at an MDU) can be serviced by the same network interface device.

More detail is provided in the exploded view of FIG. 10B. For example, FIG. 10B shows a network interface device 800 having an enclosure body 802 with a first fiber management tray 804a mounted onto (or, alternatively, formed on) an interior surface of the enclosure body 802. Fiber management tray 804a can include various fiber management areas, such as slack storage 810a, fiber splice holding section 815a, and adapter holding section 825a. In addition, network interface device 800 includes a second fiber management tray 804b, which can include various fiber management areas, such as slack storage 810b, fiber splice holding section 815b, and adapter holding section 825b. Moreover, network interface device 800 includes a third fiber management tray 804c, which can include various fiber management areas, such as slack storage 810c, fiber splice holding section 815c, and adapter holding section 825c. Each of these fiber management areas can be constructed the same as those like-numbered fiber management areas and components described previously, and are thus not described in further detail with respect to FIG. 10B. It should be noted that the enclosure body 802 can be configured to house a greater number of fiber management trays, depending on the application.

The fiber management trays can each be the same, or they can have different fiber management components disposed thereon. In addition, each fiber management tray can include a mounting structures to allow for an additional tray to be pivotably mounted thereon. This configuration allows for a compact structure when in use, but also allows an installer to easily access each tray during installation or repair. Thus, network interface device 800 can accommodate a multi-fiber drop cable, with the ability to route each drop fiber from the multi-fiber drop cable to a particular fiber management tray having a splice device pre-installed thereon. Fiber routing can be accomplished in the same manner as described previously.

Thus various aspects of the invention as described in the embodiments above provide many features, including integrated splitting and fiber management configured to hold at least one adapter; a structure that can accommodate up to twelve fiber pigtails with each connector end positioned in an adapter in a patch panel, routed in such a way as to protect and separate them from inadvertent damage; a structure having adequate space to accommodate one or more hard case splitters within a fiber storage area; a splice holding section that can secure different types of splices, such as mechanical, multi-fiber, or fusion splices; structure to hold a stripped and cleaved end of a pigtail pre-mounted in a splice device during transportation to a customer; structure to manage fibers being spliced to hold fiber-to-fiber force prior to splice actuation; a patch panel tray configured to hold an adapter field that also serves as a protective cover for fiber management and craft separation; and an integrated mechanical splice actuator.

The invention claimed is:

1. A fiber management assembly, comprising: an optical fiber splitter; a splice holding section having a fiber splice device mounted therein, further comprising a fiber splice actuation mechanism disposed in the splice holding section, wherein the fiber splice actuation mechanism is capable of actuating the fiber splice device by pressing on the actuation mechanism, wherein the fiber splice actuation mechanism comprises a flexible cantilevered arm that is integral to the tray; a slack storage system, wherein the optical fiber splitter, splice holding section and slack storage system are disposed on one of a tray and an interior surface of an enclosure body; and a patch panel tray having a patch panel comprising a plurality of adapters mounted thereon, wherein a bare end of a splitter input fiber is routed via the slack storage system to a first end of the splice device, and wherein pre-connectorized splitter output fibers are routed to different adapters of the plurality of adapters.

2. The fiber management assembly of claim 1, wherein an end of an optical fiber from a drop cable is routed around the slack storage system to a second end of the splice device.

3. The fiber management assembly of claim 1, wherein the slack storage system includes at least one fiber stay that is positioned to ensure that the fiber will remain positioned within an unactuated splice device.

4. The fiber management assembly of claim 1, further comprising a plurality of protective tabs positioned over the slack storage system.

5. The fiber management assembly of claim 1, further comprising a strain relief device that provides strain relief to a drop cable or subscriber cable.

6. The fiber management tray assembly of claim 1, further comprising a second fiber splice device, wherein the second fiber splice device is securely mounted in the splice holding section.

7. A network interface device, comprising the fiber management assembly of claim 1.

8. A network interface device, comprising: an enclosure body; a fiber management assembly disposed in the enclosure body, the fiber management assembly comprising: an optical fiber splitter; a splice holding section having a fiber splice device mounted therein, further comprising a fiber splice actuation mechanism disposed in the splice holding section, wherein the fiber splice actuation mechanism is capable of actuating the fiber splice device by pressing on the actuation mechanism, wherein the fiber splice actuation mechanism comprises a flexible cantilevered arm that is integral to the tray; a slack storage system, wherein the optical fiber splitter, splice holding section and slack storage system are disposed on one of a tray and an interior surface of the enclosure body; and a patch panel tray having a patch panel comprising a plurality of adapters mounted thereon, wherein a bare end of a splitter input fiber is routed via the slack storage system to a first end of the splice device, and wherein pre-connectorized splitter output fibers are routed to different adapters of the plurality of adapters.

9. The network interface device of claim 8, further comprising a strain relief device positioned proximate to an entry port of the enclosure body into which the drop cable or subscriber cable can enter the enclosure.

10. The fiber management assembly of claim 1, wherein an end of an optical fiber from a drop cable is routed around the slack storage system to a second end of the splice device.

11. The fiber management assembly of claim 8, wherein the slack storage system includes at least one fiber stay that is positioned to ensure that the fiber will remain positioned within an unactuated splice device.

12. The network interface device of claim 9, further comprising a second strain relief device positioned proximate a second entry port into the enclosure body.

13. The network interface device of claim 8, wherein the splice holding section, splitter and slack storage system are mounted on a tray.

14. The network interface device of claim 8, wherein the splice holding section and slack storage system are formed on an interior surface of the enclosure body.

15. The network interface device of claim 8, wherein the fiber management assembly comprises a first tray, wherein an adapter mounting section, the splice holding section and slack storage system are mounted on the first tray, and a second tray, wherein a second adapter mounting section, a second splice holding section, and a second slack storage system are mounted on the second tray.

* * * * *